(12) United States Patent
Singliar et al.

(10) Patent No.: US 8,959,042 B1
(45) Date of Patent: Feb. 17, 2015

(54) METHODS AND SYSTEMS FOR ESTIMATING SUBJECT COST FROM SURVEILLANCE

(75) Inventors: Tomas Singliar, Sammamish, WA (US);
Dragos Dorin Margineantu, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 404 days.

(21) Appl. No.: 13/405,698

(22) Filed: Feb. 27, 2012

Related U.S. Application Data

(63) Continuation-in-part of application No. 13/089,085, filed on Apr. 18, 2011, now Pat. No. 8,756,177.

(51) Int. Cl.
*G06N 5/00* (2006.01)
*G06F 1/00* (2006.01)

(52) U.S. Cl.
USPC .............................. 706/46; 340/540; 600/301

(58) Field of Classification Search
CPC ............ G06N 5/02; G06N 5/04; G06N 5/022
USPC .......................................................... 706/46
See application file for complete search history.

(56) References Cited

U.S. PATENT DOCUMENTS

| | | | |
|---|---|---|---|
| 5,374,932 A | 12/1994 | Wyschogrod et al. | |
| 6,028,626 A | 2/2000 | Aviv | |
| 7,202,884 B1 | 4/2007 | Barraclough | |
| 7,548,194 B2 | 6/2009 | Wood | |
| 7,558,404 B2 | 7/2009 | Ma et al. | |
| 2007/0132638 A1 | 6/2007 | Frazier et al. | |
| 2009/0012922 A1* | 1/2009 | Tesauro et al. | 706/12 |
| 2010/0036875 A1 | 2/2010 | Miezianko et al. | |
| 2010/0318512 A1 | 12/2010 | Ludwig | |
| 2011/0080897 A1 | 4/2011 | Hernandez et al. | |
| 2011/0134245 A1 | 6/2011 | Khizhnichenko | |

OTHER PUBLICATIONS

Demiris, $ May 2007, pp. 151-158, Prediction of intent in robotics and multi-agent.*
Demiris, Y.; Prediction of Intent in Robotics and Multi-Agent Systems; Cogn Process; May 4, 2007; pp. 151-158.

* cited by examiner

*Primary Examiner* — Li-Wu Chang
*Assistant Examiner* — Kalpana Bharadwaj
(74) *Attorney, Agent, or Firm* — Armstrong Teasdale LLP

(57) ABSTRACT

A computer-based method for analyzing the costs of agent's behaviors is described. The method includes storing data relating to a previously observed behavior of at least one of an agent of interest and at least one agent that can be assumed to hold similar utilities to the agent of interest, such that an agent class is defined, deriving with a processing device and based on the stored data, a resolving utility function, and observing a sequence of behavior of the agent of interest. The method also includes inputting the observed behavior sequence to an analyzer, deriving with a processing device and based on the observed sequence of behavior, a set of costs that the agent of interest incurred for their observed behavior, and comparing the resolving utility function derived from stored data to the set of costs derived from the observed sequence of behavior to determine anomalous behavior.

21 Claims, 10 Drawing Sheets

US 8,959,042 B1

METHODS AND SYSTEMS FOR ESTIMATING SUBJECT COST FROM SURVEILLANCE

CROSS REFERENCE TO RELATED APPLICATIONS

This patent application is a Continuation-In-Part application of U.S. patent application Ser. No. 13/089,085 filed on Apr. 18, 2011 now U.S. Pat. No. 8,756,177.

BACKGROUND

The field of the disclosure relates generally to surveillance data analysis, and more specifically, to methods and systems for estimating, from surveillance observations, the costs of actions perceived by the subject of observation, and detecting anomalous or otherwise interesting subject behavior, based on the action cost estimates.

Analysis of surveillance data is a major bottleneck in improving the situational awareness in security applications. Such security applications can be considered to range from public space surveillance to war theatre surveillance operations. Specifically, there is an abundance of video data available to consumers of such data, many times more than there are available man-hours to watch such video data. Automating analysis tasks is therefore a highly desirable goal. Among the tasks of an intelligence analyst is to determine what an observable agent (a person, or, by extension, a vehicle) intends to do, based on its previous behavior. Such observation is typically from video or radar. Another task, usually preceding the determination of intent, is simply identifying, from a large set of actors, those behaving suspiciously and warranting further attention.

This disclosure enables computational behavior analysis for agents that behave sub-optimally due to their imperfect perception of environment and/or action costs. Moreover, it allows inference about the likely percepts available to the agent.

BRIEF DESCRIPTION

In one aspect, a computer-based method for analyzing the costs of agent's behaviors is provided. The method includes storing, in a computer memory, data relating to previously observed behavior of at least one of an agent of interest and agents that can be assumed to hold similar utilities to the agent of interest, thereby defining an agent class, deriving with a processing device and based on the stored data, a set of costs that agents in the agent class could believe to be the true action costs accruing to itself in order for their observed behavior to be considered a result of their rational decision making by a observer of the behavior. Such set of costs is known as a resolving utility function. The method also includes inputting the observed behavior sequence to an analyzer, deriving with a processing device and based on the observed sequence of behavior, a set of costs that agent incurred for their observed behavior, and comparing the set of costs derived from stored data to the set of costs derived from the observed sequence of behavior to determine anomalous behavior.

In another aspect, one or more computer-readable storage media having computer-executable instructions embodied thereon are provided. When executed by at least one processor, the computer-executable instructions cause the at least one processor to store, in a computer memory, data relating to previously observed behavior of at least one of an agent of interest and agents that can be assumed to hold similar utilities to the agent of interest, thereby defining an agent class, derive with a processing device and based on the stored data, a resolving utility function, and observe a sequence of behavior of the agent of interest. The computer-executable instructions also cause the at least one processor to input the observed behavior sequence to an analyzer, derive with a processing device and based on the observed sequence of behavior, a set of costs that agent incurred for their observed behavior, and compare the set of costs derived from stored data to the set of costs derived from the observed sequence of behavior to determine anomalous behavior.

In still another aspect, a method is provided that includes utilizing the output of a tracking system to track and store observations of agent behaviors, estimating an optimal path for the agent based on the stored observations of agent behavior, deriving with a processing device and based on the stored data, a set of costs that agents in the agent class would incur using the optimal path, and determining anomalous behavior based on observations of agents and the derived set of costs.

The features, functions, and advantages that have been discussed can be achieved independently in various embodiments or may be combined in yet other embodiments further details of which can be seen with reference to the following description and drawings.

DETAILED DESCRIPTION

Figure 1:
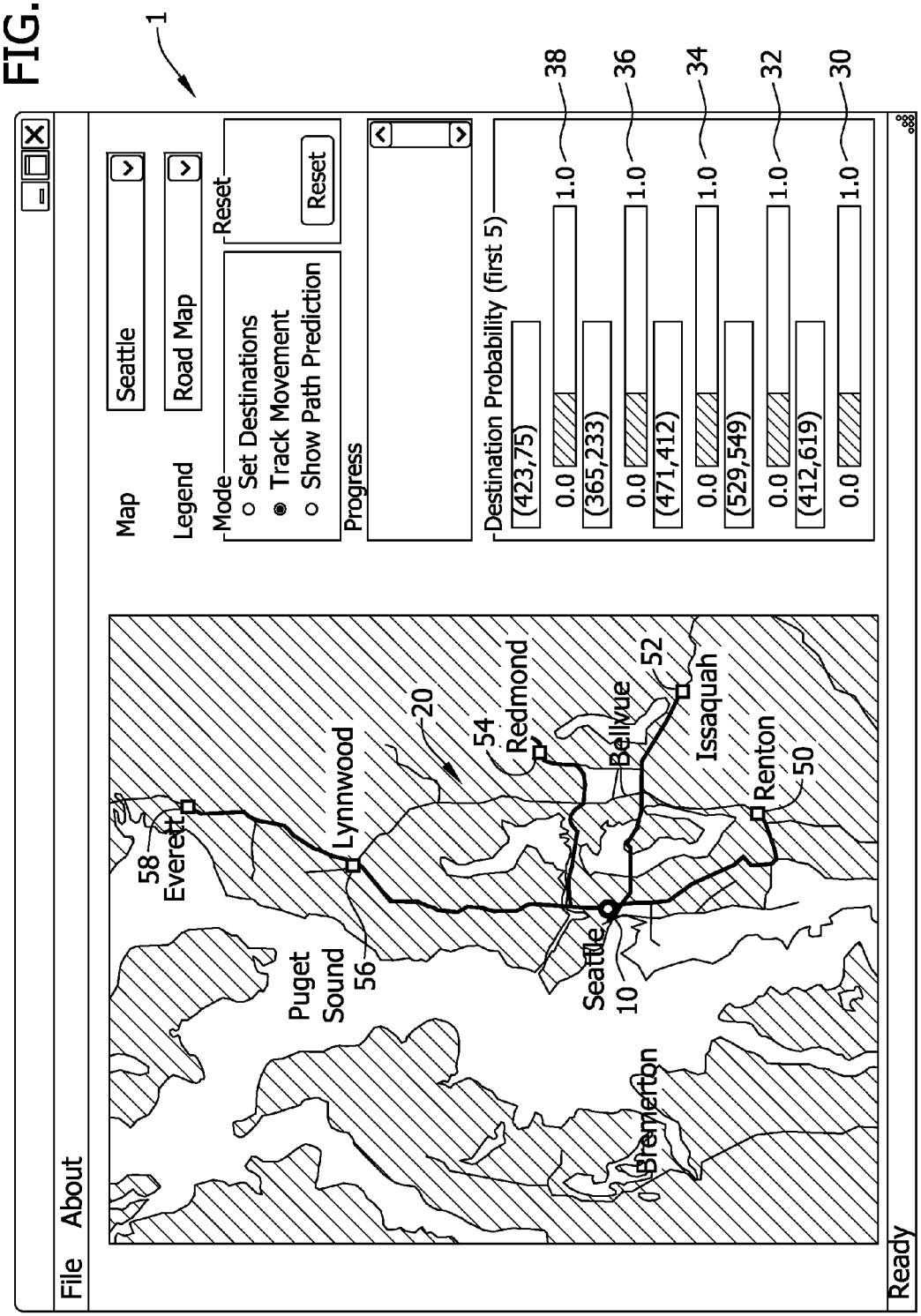
FIG. 1 is a computer display illustrating an example of behavior analysis, based on an agent (vehicle) being observed at a first discrete time as it moves on a road network, the probabilities of each destination as being the final destination being equal.

Described in embodiment herein are sets of interconnected methods for analyzing the costs associated with decisions of agents. The agent's actions may be assumed to be rational from the agent's internal perspective but the implicit action costs (utilities) used by such agents in their decision-making are a-priori unknown to the observer. Action costs are known as the opposite of rewards and utilities, which can be used interchangeably with rewards. One method includes the steps of storing, in a computer memory, data relating to previously observed behavior of at least one of an agent of interest and agents that can be assumed to hold similar utilities to the agent of interest, thereby defining an agent class, deriving with a processing device and based on the stored data, a resolving utility function, and observing a sequence of behavior of the agent of interest. The method also includes inputting the observed behavior sequence to an analyzer, deriving with a processing device and based on the observed sequence of behavior, a set of costs that agent incurred for their observed behavior, and comparing the set of costs derived from stored data to the set of costs derived from the observed sequence of behavior to determine anomalous behavior.

In particular embodiments, surveillance data is utilized to predict the future actions. Such surveillance data includes, for example, vehicle movement tracks such as (Moving Target Indicator) MTI or (Synthetic Aperture RADAR) SAR data as is collected in military intelligence.

FIGS. 1-4 provide understanding as a concrete example of behavior analysis. Referring to the user interface 1 of FIG. 1, an agent 10 is a vehicle being observed at discrete times as it moves on a road network 20 of Seattle. For this example it is assumed that the utilities are known and represented by the time cost of travel on various classes of roads. The predictive question in this example is where is the agent (vehicle) going? To simplify the example the set of the vehicle's possible destinations is limited to five, which are shown individually in the user interface 1 as destination probabilities 30, 32, 34, 36, and 38 and denoted in the map as squares.

In FIGS. 1-4, each observed agent position is represented by a circle. The consecutive observations (circles) are connected with lines to show the sequencing of the observations. The considered destinations are denoted by squares. The progress bars in the respective destination probabilities 30, 32, 34, 36, and 38 respectively show the probability, for each destination 50, 52, 54, 56, and 58, that the agent is headed there. In the example of FIGS. 1-4, the vehicle is in Seattle. This information alone does not reveal any information about its destination, therefore in FIG. 1, the probability bars therefore show all destinations as equally probable.

Figure 2:
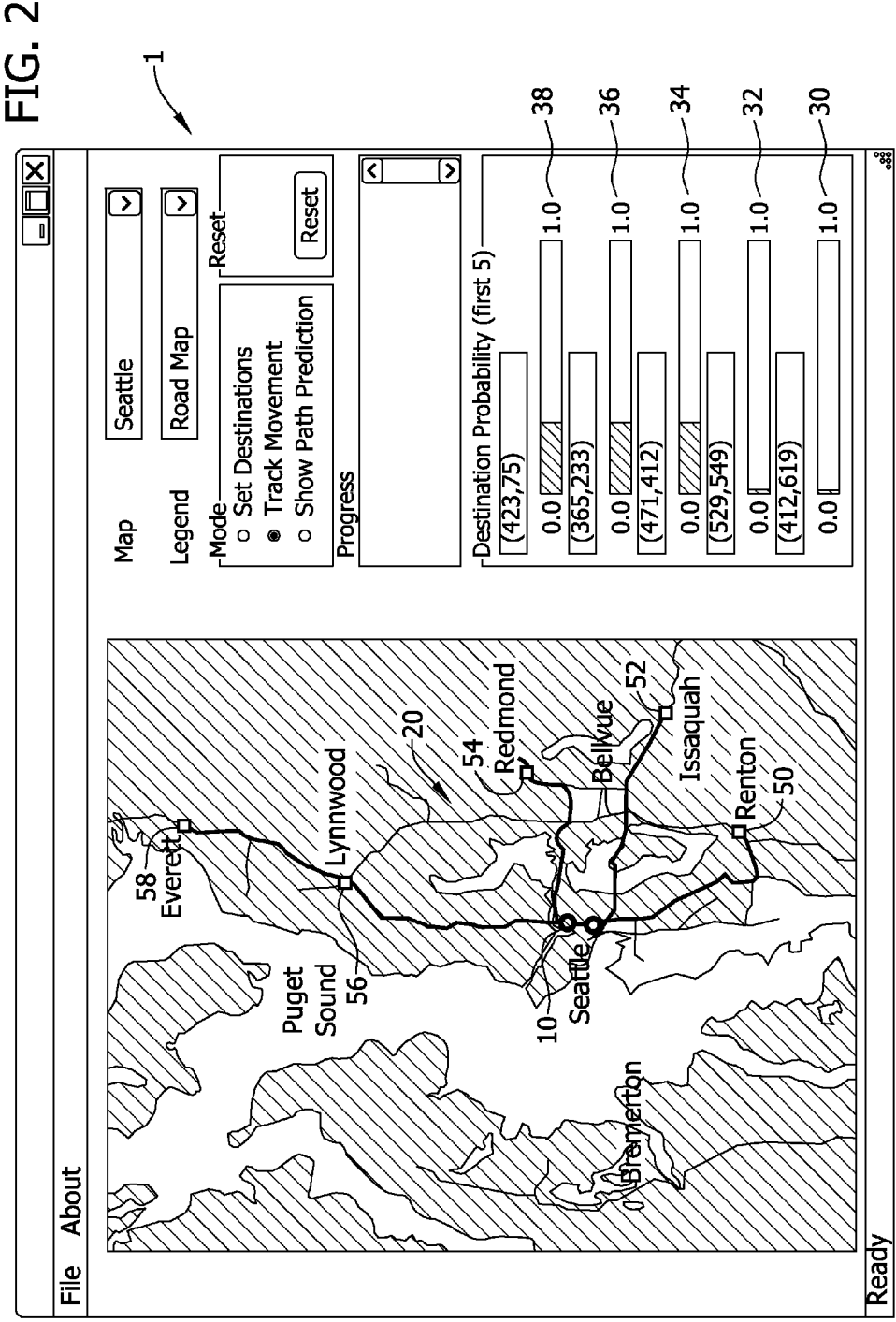
FIG. 2 is a computer display further illustrating the example of FIG. 1, wherein the agent is being observed at a second discrete time as it moves on the road network, the probabilities of certain destinations as being the final destination increasing based on the movement of the agent.

In FIG. 2, the agent 10 has moved slightly northward. This action is consistent with heading to any of the three northernmost destinations 54, 56, and 58, but inconsistent with the two southernmost destinations 50 and 52. Thus, as shown in the progress bars of the user interface, the probability of the three destinations is increased at the expense of the southern destinations. Since the agent's expected cost to all three northern destinations is reduced by the same amount, they remain equally probable.

Figure 3:
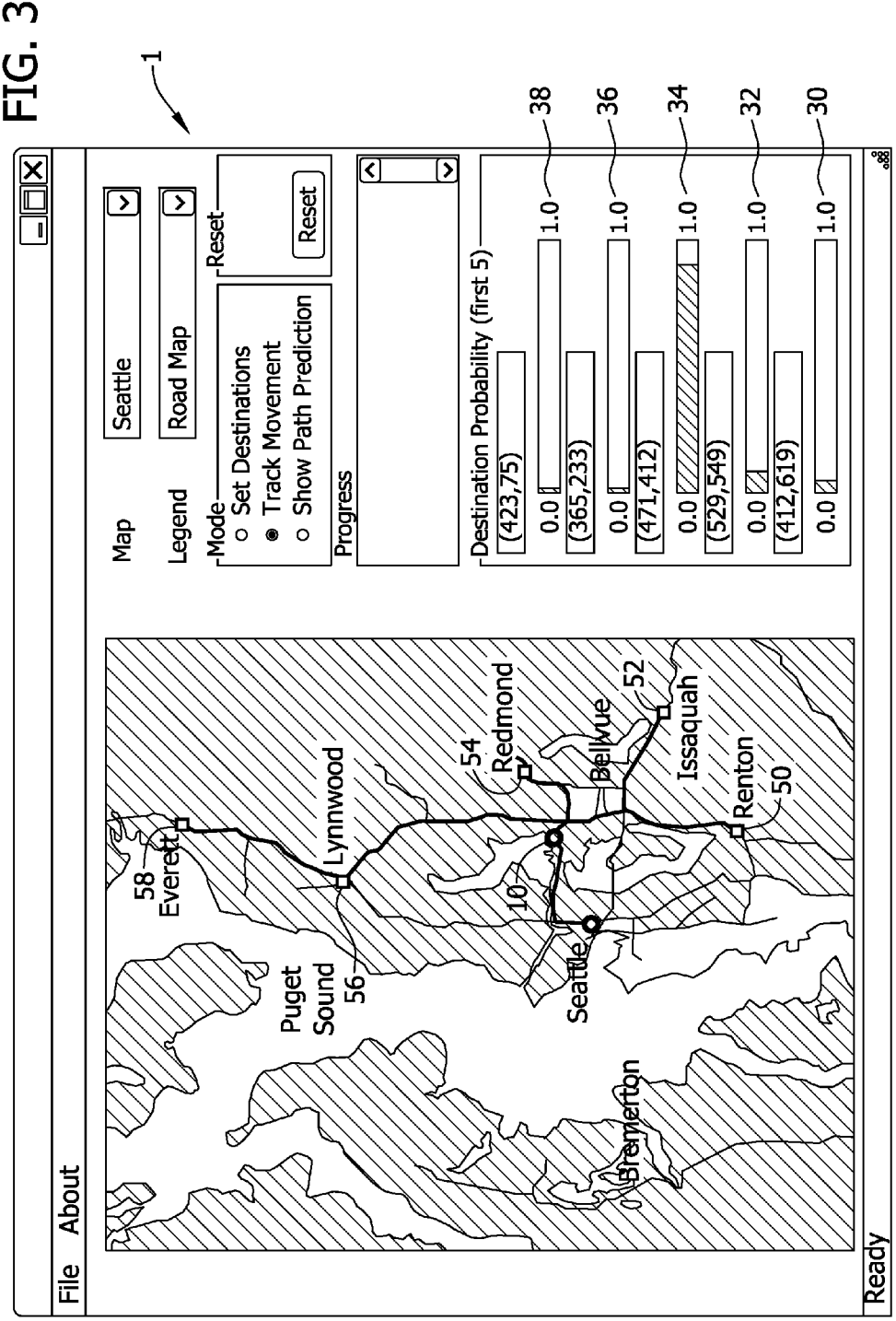
FIG. 3 is a computer display further illustrating the example of FIG. 1, the agent being observed at a third discrete time as it moves on the road network, the movement reducing its expected cost to one of the possible destinations the most, making that destination has become the most probable estimate.

In FIG. 3, the agent 10 (vehicle) has headed eastward. Because this action reduced its expected cost to destination 54 (Redmond) the most, that destination has become the most probable estimate 34, again, as shown in the probability bars 30-38.

Figure 4:
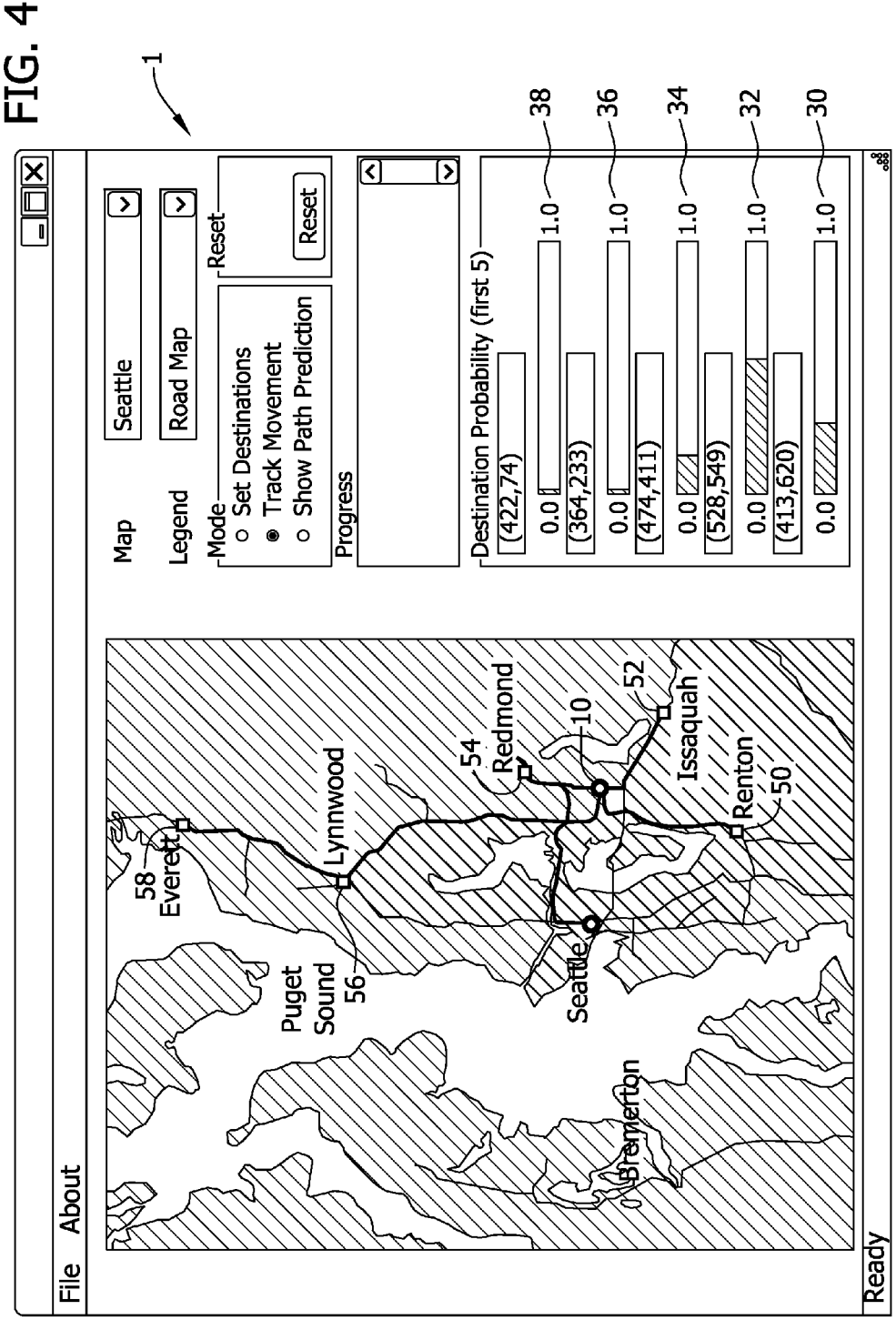
FIG. 4 is a computer display further illustrating the example of FIG. 1, the agent being observed at a fourth discrete time as it moves on the road network, the movement being inconsistent with proceeding to the previously determined most probable destination, the destination probabilities having been updated accordingly.

However, as shown in FIG. 4, the agent 10 has continued to the neighborhoods of Bellevue. This action is inconsistent with proceeding to destination 54 (Redmond), so the two southern destinations 50 and 52 are now the most probable ones, as shown by the probability bars 30-38.

However, in the last step, an anomaly might be declared as the agent has not behaved rationally with respect to any of the defined destinations. In the example of FIGS. 1-4, it is rather clear that there is insufficient coverage of possible destinations. However, if the destinations are well covered, the behavior of agent 10 is flagged for further analysis since an alternative explanation should be sought. The embodiments described herein are directed to systems and computational methods for estimating the action costs of an agent in question to each member of a set of possible goals.

Figure 5A:
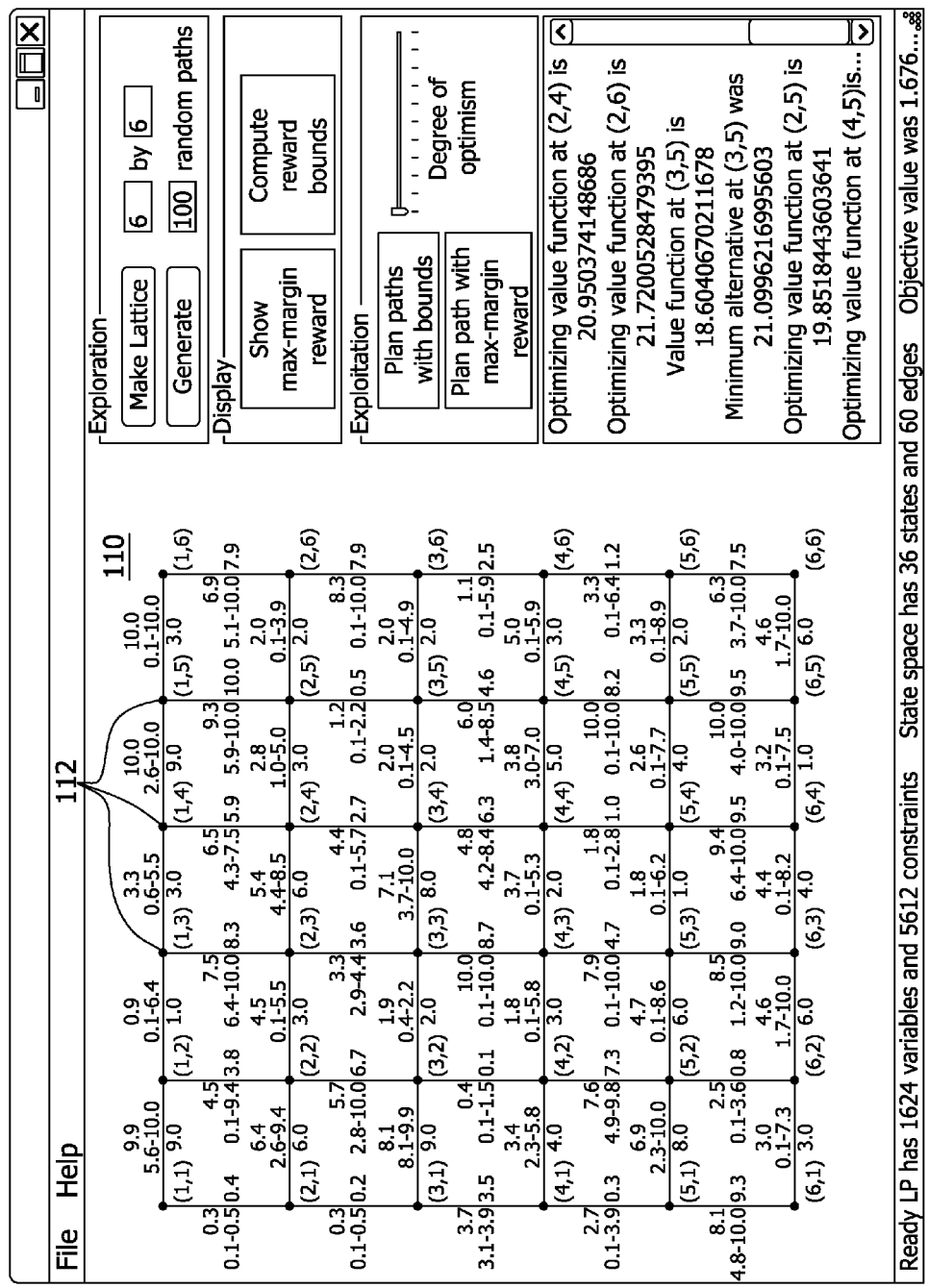
FIGS. 5A and 5B are embodiments of a user interface for a tool developed for the purpose of determining costs of actions in a state space, such as moving along the road network as illustrated in FIGS. 1-4, and capable of visualizing planar-shaped state spaces such as the regular mesh shown.
Figure 5B:
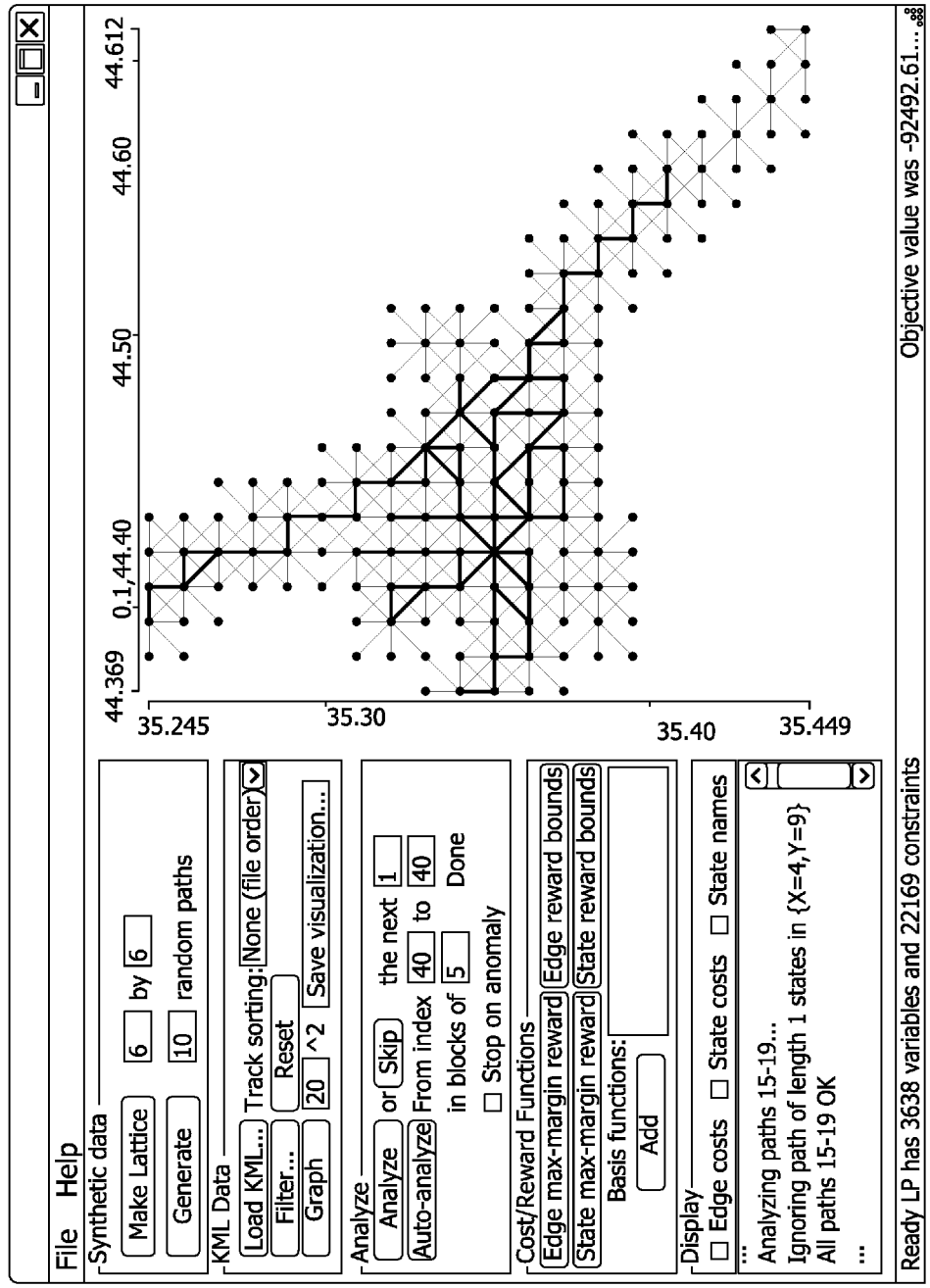
Figure 6:
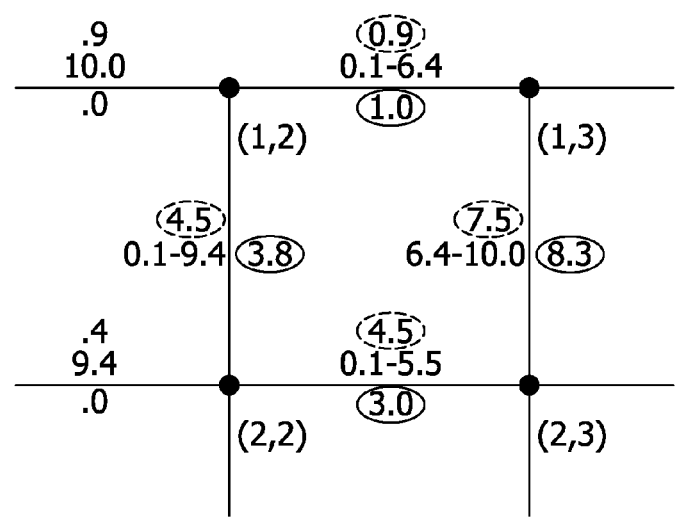
FIG. 6 is an enlargement of a portion of the mesh network of FIG. 5A, including encircled numbers that represent the true and estimated costs of traversing from node to node.

FIGS. 5 and 6 illustrate deriving the cost of actions in a mesh space 100. In the example of FIGS. 1-4, it was assumed that the costs which the agent incurs are known. That is, for each road, it was known how fast one could travel on the road and therefore the time cost of travel on each road could be determined. The space of actions available to the agent at each location was identical to the set of adjacent locations to which to move, and useable to determine agent intent. However, in the simplest possible generalization of the example, the state of the roadways may not be known, and therefore how long it takes to traverse each road segment cannot be known. As such, observation of behavior allows for determination of costs to an agent for various actions.

FIGS. 5A and 5B are a screenshots of a user interface 100 and 150 respectively for a tool developed for the purpose of determining such costs. To a first approximation, the graph 110 of nodes 112 arranged in a square grid is thought of as a map of a part of a city. It is observed that many people take trips from one location (node) to another location (another node), observing the path they take and observing their trip times. From these observations, it can be inferred which road segment combinations are preferable to others. Consider the enlargement of a portion of FIG. 5A shown in FIG. 6, in which the numbers encircled with a solid line represent the true cost of traversing the edge of the graph. These costs are known, for example, to the agents being observed, but not to the observer. Any agent going from node (1,2) to node (2,3) would prefer the route through node (2,2) at a cost of 6.8=3.8+3.0 to the route through node (1,3) at a cost of 9.3=1.0+8.3.

Figure 7:
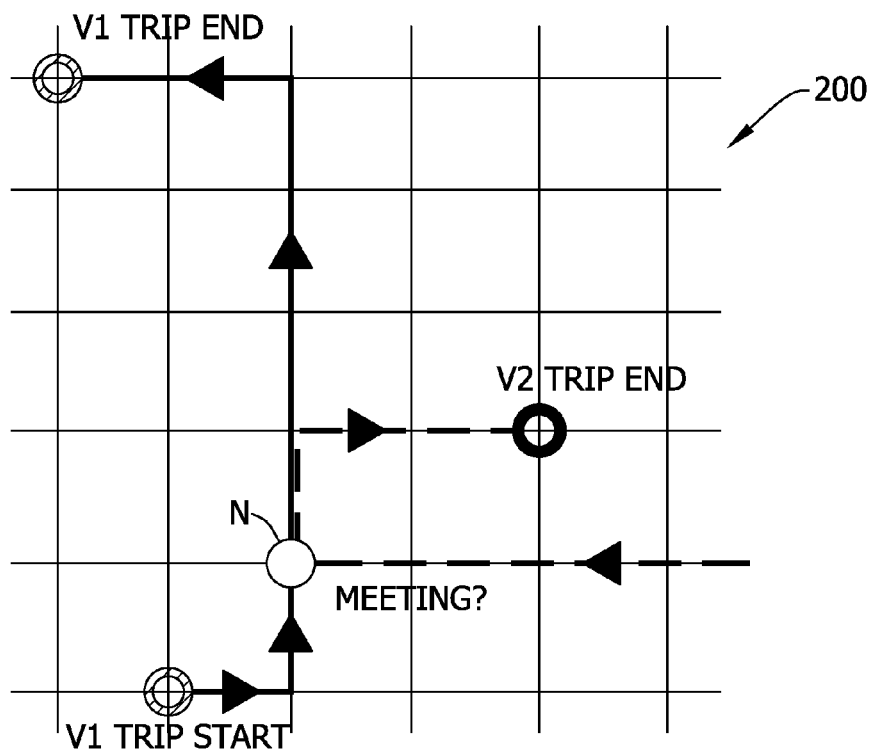
FIG. 7 is a graphical representation of an observation of two agents briefly collocating, the representation relating to an analysis of agent behavior indicating whether the meeting was accidental or intentional.

Also disclosed is a method for using estimations of actions and state costs from multiple observations of action sequences performed either repeatedly by the same agent, or by a class of agents that have similar cost models, to build a mode of reasoning, exemplified by the meeting detection scenario described in the following sentences. Referring to FIG. 7, which is indicative of an analysis of accidental vs. intentional meeting, it is observed that two agents briefly collocate (e.g. two cars stopping next to each other), at a node (N) then go their separate ways. It is quite common to be able to discern such meetings of vehicles in the kind of imagery intelligence analysts work with, but the resolution is typically insufficient to ascertain further details, such as whether this was accidental or perhaps whether an exchange has taken place. Assuming that the grid 200 is a regular road grid, common-sense reasoning would be along the lines of "since both agents could have proceeded to their destination more directly, there is something else explaining their seemingly irrational trajectories". Thus it is likely that the meeting at node N was intentional. The described embodiments also formalize this mode of reasoning about agents' utilities in mathematical formulae and computer code.

These examples are illustrative and not intended to limit the applicability of the invention to analyzing movements in a two-dimensional grid. While that is the most readily accessible application of the described methods, as analytical methods the components of the described embodiments are in principle applicable to any state space where the action of an agent changes the state of the world through any action. Thus the example of FIGS. 5 and 6 should be thought of as an image of an abstract space where there are four actions (graph links) available to the agent in most world states (graph nodes).

The embodiments describe a method of analyzing the behavior of agents in terms of their cost structure and using the results of this description for the purposes of pointing out automatically agents that do not conform to the assumed class of cost structure (anomaly detection), predicting single or multiple agent behavior, and understanding a rationale of an agent's action or sequence of actions.

The following paragraphs describe a methodology and a programmed apparatus that provide the functions described by the examples of FIGS. 1-7.

Analyzing the Cost Structure Through Linear Programming with Basis Functions

In one embodiment, a linear program (LP) in the general case is produced with basis functions as follows:

$$\text{cost}(a) = \sum_j w_j \phi_j(a) \qquad (1)$$

In this equation, basis functions $\phi_j(a)$ represent observable aspects of the environment. For example, in the case of a vehicle driving, $\phi_j(a)$ could represent the length of a road segment a, driven by an agent. In one embodiment, Equation 1 is further generalized by representing cost(a,i) as the cost of action by:

$$\text{cost}(a,i) = C(F(a), V(i), K(i)) \qquad (2)$$

In such an embodiment, F(a) represents the vector of features of action a (e.g. the length of a road segment or presence of a checkpoint), and i represents an agent. In Equation 1, the features of action a correspond to $\phi_j$. V(i) represents the valuation parameters held by agent i. In Equation 1, $w_j$ represents valuation parameters shared across all agents. K(i) represents knowledge parameters corresponding to the knowledge of the agent i. Equation 1 does not include knowledge parameters and is applicable to the computationally simpler case when agents are assumed to perceive action costs perfectly.

In one embodiment, variables $k_{ij} \in \{0,1\}$ are introduced to represent the knowledge of agent i about a feature j. In such an embodiment, the cost of Equation 1 is expressed as:

$$\text{cost}(a,i) = \sum_j w_j \phi_j(a) k_{ij} \qquad (3)$$

In the exemplary embodiment, knowledge parameters can be observed or unobserved. In the formulation of Equation 3, if more than a few of the $k_{ij} \in \{0,1\}$ are unobserved, the resulting optimization problems are expensive-to-solve mixed integer linear or quadratic programs.

As the definition of the cost function changes, as illustrated above, the corresponding optimization method needs to change to optimize an objective that combines the planning losses (such as the maximum-margin planning objective) and a knowledge losses. As such, the general form of the objective function for jointly recovering the valuation and knowledge parameters from a set of tracks T is:

$$V^*, K^* = \underset{V,K}{\text{argmin}}\, planMarg(T,K) + R \cdot regularizer(K) \qquad (4)$$

$$planMarg(T,K) = \sum_{t_i \in T} \sum_{a \in t_i} [\text{cost}(a,i,K) - \text{cost}(alt(a,K),i)] \qquad (5)$$

In the exemplary embodiment, cost(alt(a,K),i) represents the best alternative action available to agent i in the state where a was performed. R represents a constant that controls the tradeoff between making the agents maximally rational (selecting the widest planning margin) and maximally observant (having the most precise knowledge). A regularizer is utilized to restrain the optimization problem. At one extreme, if a regularizer is not used, then any course of action can be explained as rational by the mathematical equivalent of "I thought that would be fun." One suitable regularizer is the log-likelihood of the knowledge represented by parameters K under some prior distribution. For example, it is unlikely that a vehicle agent would prefer the shortest path for a portion of its track, and then begin preferring to circle around. The associated penalty would push the system to look for an explanation in terms of other cost components first.

The regularizer should be selected in a functional form suitably matched to the nature of the dependence of the cost function C on K. In the following section, the regularizer takes on the form of $L_1$ penalty. This formulation allows the system to resolve a variety of questions about the agent's percepts (as modulated by its beliefs) by solving the optimization problem with respect to subsets of K, holding V (and possibly parts of K) fixed as:

$$J^* = \underset{J \subset K}{\text{argmin}}\, planMarg(T,J) + R\, regularizer(K) \qquad (6)$$

All formulations proposed here can be directly without loss of generality applied to states, rather than actions.

In one embodiment, the true cost of an action is assumed to be a linear combination of basis functions. However, an agent may perceive cost differently, and to account for such a deviating perception, a perception noise variable is added to the cost function as:

$$\text{cost}(a,i) = w^T f(a) + n(a,i) \qquad (7)$$

In such an embodiment, w is a vector of weights associated with the feature functions $f(a)$. n(a,i) is a noise variable which can take on arbitrary values and represents the perception noise. Without the use of a regularization which constrains the amount of perception noise the analysis is allowed to assume, this amount of arbitrary information would generally render the problem formulation essentially vacuous. In one embodiment, N denotes the set of the noise variables, N={n(a,i)} $\forall a \in t_j, t_j \in T$ such that the regularizer is given by sum of absolute values as:

$$regularizer(N) = \sum |n(a,i)| \qquad (8)$$

In the exemplary embodiment, the set of weights w represents the valuation parameters V, and the set N of perception noises represents the knowledge parameters K. In such an embodiment, feature values are denoted $f(a)$ and not indexed by i, signifying that they are true values, properties of the actions and states, rather than the agent's perceptions of these. They are assumed to be observed by both the analyzing system and the agents performing the behaviors being analyzed. The w is assumed to be shared by all agents (and thus not indexed by i). As such, there is a separate perception noise variable for each agent-action pair.

Intersection locations represent agent states in the exemplary embodiment implementing ground moving target indication (GMTI) analysis. The actions of the agents correspond to travel along road segments from one intersection to another. The underlying road network is used to build the state space as follows: every intersection becomes a state, and every road connection between adjacent intersection because an edge (action) in the state space. In the event that a road network is not mapped, a rectangular grid is overlaid across the extent of the road network to ensure representation. Nodes of the rectangular grid which are within a grid cell diagonal length of distance from a road-derived state are discarded, along with their incident edges. Nodes of the rectangular grid not discarded are retained as states. Nodes of the rectangular grid which lost graph neighbors are linked to as many nodes of the road-network derived state space as is necessary for them to have the same number of graph neighbors as they had in the rectangular grid (typically 4), and in the order of spatial proximity to the road-derived states. Features such as segment length and presence of checkpoints are associated with either edges or states (as appropriate) during this process.

Vehicle positions are mapped to states according to which region of the Voronoi diagram they fall into, and each position is assigned to the spatially-nearest state. The vehicle tracks are considered in the order of time of execution of the action sequence they capture. The estimation of w and N in Equation 7 is performed after each track. If the estimation is successful, the associated linear program is feasible and the track is considered explainable and we proceed to evaluate special detection conditions for the track. If none of the conditions holds, we proceed to the next track. If one of the special conditions holds, the track is noted as suspicious and presented to the user. Should the estimation be unsuccessful, the track in question must be internally inconsistent and there is no possible assignment of w and N that enables the track to fulfill the rationality constraints. Such calculations will most frequently occur with tracks that exhibit looping behavior, which cannot be rational under the assumption that the vehicle travels between two locations minimizing a positive cost of travel. Inconsistent tracks are presented to the user as anomalous. An example of an inconsistent track is shown in FIG. 2.

Under this framework, the concept of an action being inexplicable or suspicious is taken to be with respect to a set of basis functions. It is entirely possible that it is the basis function set and not the track itself that is at fault and this is resolved by the analyst. In one embodiment, the methodology of analysis is utilized in ship movement analysis and anomaly detection, aiming similarly to detect unusual and apparently irrational behaviors. Alternatively, the analysis described above can be utilized to evaluate any rational behavior with varying degrees of difficulty and computational complexity.

In the exemplary embodiment, it is possible to reason about the amount of "misperception" that is required to explain the observed behavior as rational. In particular, to detect suspicious behavior the equation is executed as shown by:

$$N_i = \sum_{a \in t_i} |\hat{n}(a, i)| \qquad (9)$$

Equation 9 is used to recover noise variables for each track, where the sum of absolute perception noise is the measure of deviation from perfect rationality. In Equation 9, $\hat{n}(a,i)$ are the estimated values of $\hat{n}(a,i)$. From this, a special detection condition can be created for deeming a track suspicious that tests for irrational behavior by several methods.

In one embodiment, thresholding N relative to the total cost of the route taken, as experienced by the agent is accomplished for deeming a track suspicious. This condition is activated when the estimated noise in perceived action cost exceeds a fraction of the estimated cost experienced by the agent by:

$$\frac{N_i}{\sum_{a \in t_i} \widehat{\mathrm{cost}}(a, i)} > a \qquad (10)$$

In an alternative embodiment, thresholding to the true estimated cost is accomplished for deeming a track suspicious. This condition is activated when the estimated cost in the denominator is computed without incorporating the noise variables. In yet another embodiment, thresholding to the estimated optimal cost is accomplished for deeming a track suspicious. This condition is activated when the sum in the denominator ranges over the actions in track that would be optimal under the estimated values of w. The choice of the most advantageous method of varies by specific embodiment and may be established experimentally.

In one embodiment, the above-identified method is utilized to track marine vessel movement. In such an embodiment, an Automatic Identification System (AIS) provides declared destinations for each vessel. As such, another method to detect suspicious actions is to compare the actions the vessel actually takes with the plan optimally reaching the declared destination. As in any rational planning domain, there may be multiple routes that are very close in cost. Therefore, the appropriate criterion for detecting suspiciousness in not a deviation from the optimal plan, but taking actions that result in a significant increase of total plan cost. For instance, as shown in FIG. 4, it may be optimal to travel from Renton to Lynwood using I-405, but an agent taking I-5 is not grossly irrational, because the increase in cost of travel or distance over the optimal plan is very small. Again, $N_i$ is the quantity measuring the total cost misperception required to explain the behavior.

In the exemplary embodiment, to account for coexistence of multiple classed of benign or non-alertable behaviors, multiple models may be maintained. Multiple models are noted by sets of valuation parameters V. This occurs for instance when passenger and delivery vehicles coexist and cannot be distinguished a-priori (e.g. by the intensity of radar return). Then, for an action sequence (e.g. vehicle track) to be deemed anomalous, it should be anomalous under the previous definition using for each set of valuation parameters. A problem arises when a track is deemed normal for multiple classes of agents and therefore multiple valuation parameter sets. In the exemplary embodiment, the track is assigned into the set which minimizes the corresponding $N_i$. If a track is perfectly rational ($N_i=0$) under multiple sets of valuations, a mixture approach may be taken where the objective functions are modified to weight (this is a different, additional weight than w) the cost associated with track i by a factor of 1/k, where k is the number of classes under which the track is optimal. A track can however be reevaluated as more tracks are added to the class, and its $N_i$ can rise from 0. A principled solution to this problem would be a soft assignment using a softmax function. This principled approach is under investigation as it brings some computational difficulties, requiring significant amounts of recomputation as tracks are analyzed.

Predicting Agent's Future Actions

Once the bounds on the utilities are established, the behavior of an agent maximizing its utilities is largely dictated. The tighter the bounds, the more certainty exists in this prediction. Discussed herein is the deterministic case where an action in a state s reliably leads to a single state s' which is determinable before the action is even contemplated. The computation of the agent's optimal action is then a matter of applying the appropriate dynamic programming algorithm, which are well-understood and efficient in the deterministic case.

Process for Building a Suitable Basis Through Interactive Analysis.

When an anomaly occurs, the analyst is presented with it and the analyst can either dispose of the example as uninteresting, and the example will be excluded from further analysis. Otherwise the example can be saved and explained away by other costs that the agent has, and not be used not extend the basis function set.

Alternatively, a computer user interface is employed to construct a basis function that explains the agent's behavior and extend the basis set. The analyst, or the user interface in his stead, may attach to the basis function metadata indicating, for instance, that positive values of the associated coefficient tend to indicate a benign intent. For instance, for an agent making a side trip (otherwise anomalous, since it involves an irrational choice of a longer route), the analyst may note that the agent passed a desirable location and add "distance to this location" into the basis function set. The system will then re-analyze the behaviors of the agent class and derive the bounds on the rewards associated with being in proximity to this location, explaining the side-trip anomaly.

Large-scale analysis of vehicle and person movement data is described. Sources of just data include, but are not limited to surveillance video, GPS (such as from cellular telephones), RFID and other sources of location-based data may be utilized to generate moving target indicator (MTI)-type data. Such data may be applied in applications related to land, sea, air, and space targets.

Figure 9:
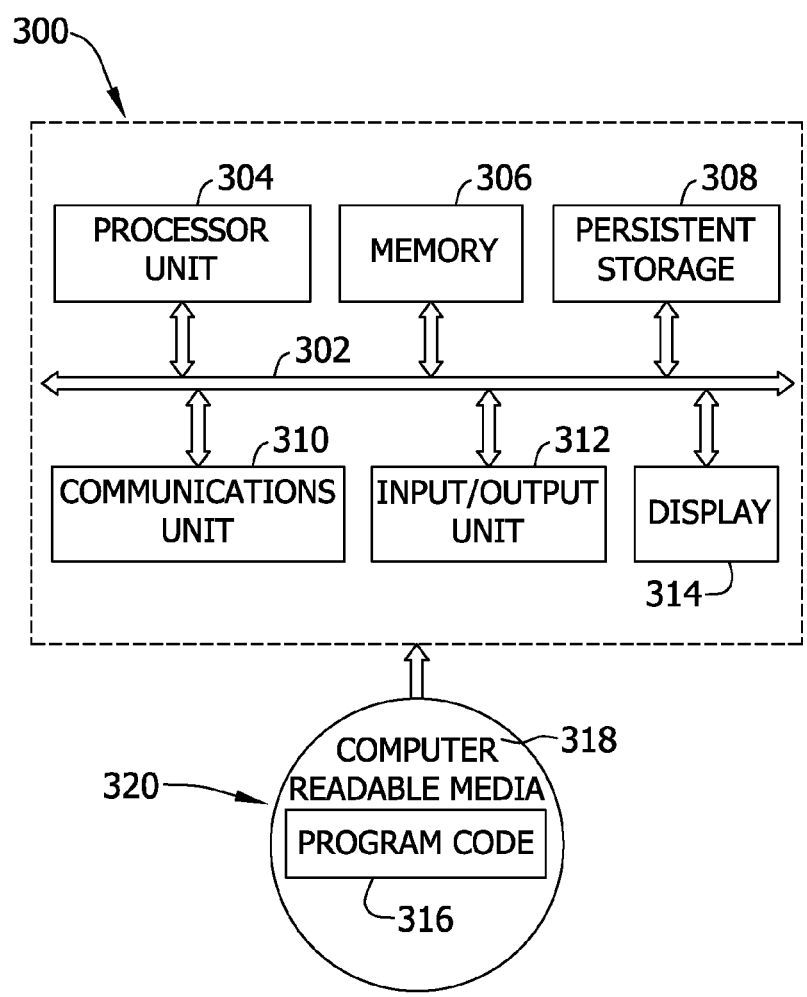
FIG. 9 is a diagram of a data processing system.

In regards to FIG. 9, a diagram of a data processing system is depicted in accordance with an illustrative embodiment. In this example, data processing system 300 includes communications fabric 302 that enables communications between processor unit 304, memory 306, persistent storage 308, communications unit 310, input/output (I/O) unit 312, and display 314 and is operable for being programmed with and executing the algorithms described herein.

Processor unit 304 executes instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 7 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 8:
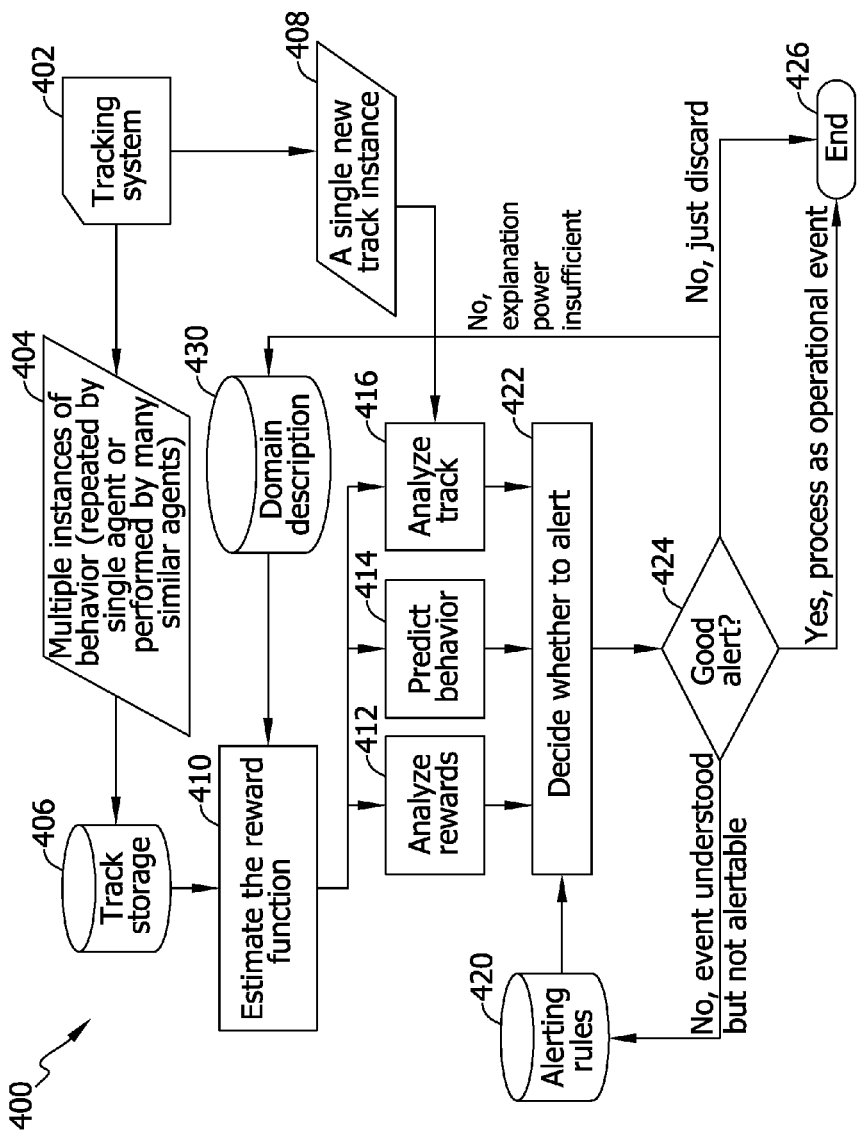
FIG. 8 is a flowchart summarizing a process for analyzing the costs and predicting the future actions of agents.

As mentioned above, the above described system is operable for executing the algorithms described herein. FIG. 8 is a flowchart 400 which summarizes methods for the various algorithms.

A tracking system 402 is utilized to track agent observations. Observations, for example, multiple instances of behavior 404 including those repeated by a single agent or performed by multiple agents are stored within a tracking storage area 406. Tracking storage area 406 may be memory 306, persistent storage 308, computer readable media 318 or other suitable storage. Tracking system 402 also is configured to recognize instances of new single tracks 408.

Based on the stored behavior, a resolving utility function is derived. For example, a reward function for the agent can be estimated 410. In various embodiments, the resolving function may be characterized in terms of action cost instead of reward. As previously stated, action costs are known as the opposite of rewards and utilities, which can be used interchangeably with rewards. Based on the estimation 410, rewards for expected behavior can be analyzed 412, further behaviors predicted 414, and tracks analyzed 416. Instances of new single tracks 408 may also be analyzed 416.

Alerting rules 420 along the analyzed rewards 412 for expected behavior, behaviors predicted 414, and tracks analyzed 416 are utilized in deciding 422 whether to issue an alert based on an agent observation. To determine if an alert will be a good alert 424, the system user judges whether the system "understood" the behavior (used the relevant basis functions in the support of the alert), and whether the alert has operational relevance ("good alert"). If an event is understood but non-alertable because an event of this type is not of interest, the alerting rules are updated using suitable user interface (e.g., the system user might indicate, with the assistance of the user interface something like: "the digging is interesting to me, but only digging on the side of the road, not in the fields like you are showing me"). Alternatively, the alert may simply be discarded and the processing for the alert ends 426 if the analyst judges that the event type is alertable, but this particular event is not of interest (e.g., "I'm not too worried about this speeding vehicle, but keep showing them to me"). Still alternatively, if the alert is not good, due to an insufficient breadth of explanation considered by the system, the analyst may provide additional domain descriptions 430 in terms of a new basis function built as previously described with help of the user interface (e.g., the user indicating something to the effect: "Yes, that's a meeting, but you failed to consider it happens near a gas station, so it's probably just guys accidentally parking next to each other getting gas. Next time, consider whether the meeting occurs at a gas station or a store"). If the alert is determined to be a good alert, the alert is processed as an operational event (e.g., the analyst follows the procedure for having identified a surveillance/intervention target), achieving the business goal of the system, and the processing for the alert ends 426.

In the exemplary embodiment, the above described process is executed on one or more processors and memory devices such as those described with respect to FIG. 9. For example, processor 304 is programmed to execute computer-executable instructions, which may be stored in memory device 306, to perform the computations described herein. For example, any or all of the operations described herein may be encoded as computer-executable instructions and executed by processor 304.

The methods described herein may be encoded as executable instructions embodied in a computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data, such as computer-executable instructions.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for analyzing the costs of an agent, said method comprising:
    storing, in a computer memory, data relating to a previously observed behavior of at least one of an agent of interest and at least one agent that can be assumed to hold similar utilities to the agent of interest, such that an agent class is defined;
    deriving with a processing device and based on the stored data, a resolving utility function;
    observing a sequence of behavior of the agent of interest;
    inputting the observed behavior sequence to an analyzer;
    deriving with a processing device and based on the observed sequence of behavior, a set of costs that the agent of interest incurred for their observed behavior;
    determining at least one percept of the agent regarding the set of costs; and
    comparing the resolving utility function derived from stored data to the set of costs derived from the observed sequence of behavior and the at least one percept regarding the set of costs to determine anomalous behavior.

2. The method according to claim 1 further comprising:
deriving specific goals of the agent for the observed sequence of behavior; and
predicting future actions of the agent of interest by determining a minimum-cost action sequence which leads the agent of interest to achieve its stated or derived goals from its present state.

3. The method according to claim 2 wherein the step of predicting future actions of the agent of interest comprises analyzing future actions of the agent of interest based on the minimum-cost action sequence for the agent of interest.

4. The method according to claim 2 wherein predicting future actions of the agent of interest comprises assigning a probability of being a goal of the agent of interest to each member of the agent class.

5. The method according to claim 2 wherein inputting the observed behavior sequence to an analyzer comprises inputting the observed behavior sequence into a processing device executing an executable algorithm.

6. The method according to claim 2 further comprising determining if an agent of interest does not conform to the predicted future actions.

7. The method according to claim 1 wherein deriving a resolving utility function further comprises deriving a cost for each possible action of the agent of interest in a mesh space.

8. The method according to claim 7 wherein deriving a cost for each possible action of the agent of interest comprises:
associating a cost function with each state and action pair defining a possible action;
calculating a cost-to-go function expressing an unknown shortest distance associated with each destination; and
denoting the cost incurred by the unique action of moving to each destination.

9. The method according to claim 8 further comprising:
adding a path cost constraint for each observed path, wherein the constraint is specifying that the total cost for a path be the sum of action and state costs for all action and states on the path, the path being an interleaved sequence of actions and states representing the agent's action sequence;
inserting a "Bellman" constraint for each state on the path and for each neighboring state on the path; and
solving the cost functions using a maximization objective that is the sum of terms expressing the margin for each action taken.

10. The method according to claim 8 wherein a cost is an expected cost that extends formulations to a probabilistic case.

11. The method according to claim 1 further comprising at least one of:
disposing of the action example as uninteresting such that it will not be further analyzed;
saving the action example and explaining the example away by other costs afforded to the agent of interest; and
constructing a basis function that explains the behavior of the agent of interest.

12. One or more computer-readable storage media having computer-executable instructions embodied thereon, wherein when executed by at least one processor, the computer-executable instructions cause the at least one processor to:
store, in a computer memory, data relating to previously observed behavior of at least one of an agent of interest and agents that can be assumed to hold similar utilities to the agent of interest, thereby defining an agent class;
derive with a processing device and based on the stored data a resolving utility function;
observe a sequence of behavior of the agent of interest;
input the observed behavior sequence to an analyzer;
derive with a processing device and based on the observed sequence of behavior, a resolving utility function;
derive with a processing device and based on the observed sequence of behavior, a set of costs that the agent of interest incurred for their observed behavior;
determine at least one percept of the agent regarding the set of costs; and
compare the resolving utility function derived from stored data to the set of costs derived from the observed sequence of behavior and the at least one percept regarding the set of costs to determine anomalous behavior.

13. One or more computer-readable storage media having computer-executable instructions embodied thereon according to claim 12 wherein when executed by at least one processor, the computer-executable instructions cause the at least one processor to:
derive specific goals of the agent for the observed sequence of behavior; and
predict future actions of the agent of interest based on a minimum set of costs for the agent of interest and the derived goals.

14. One or more computer-readable storage media having computer-executable instructions embodied thereon according to claim 13 wherein to predict future actions of the agent of interest, the computer-executable instructions cause the at least one processor to analyze future actions of the agent of interest based on the minimum costs for the agent of interest.

15. One or more computer-readable storage media having computer-executable instructions embodied thereon according to claim 13 wherein to predict future actions of the agent of interest, the computer-executable instructions cause the at least one processor to assign a probability of being a goal of the agent of interest to each member of a set of possible goals.

16. One or more computer-readable storage media having computer-executable instructions embodied thereon according to claim 12 wherein the computer-executable instructions cause the at least one processor to point out an agent of interest that does not conform to the predicted future actions.

17. One or more computer-readable storage media having computer-executable instructions embodied thereon according to claim 12 wherein to derive a resolving utility function, the computer-executable instructions cause the at least one processor to derive a cost for each possible action of the agent of interest in a mesh space.

18. One or more computer-readable storage media having computer-executable instructions embodied thereon according to claim 12 wherein the computer-executable instructions cause the at least one processor to:
associate a cost function with each state and action pair defining a possible action;
calculate a cost-to-go function expressing an unknown shortest distance associated with each destination; and
use a function to denote the cost incurred by the unique action of moving to each destination.

19. One or more computer-readable storage media having computer-executable instructions embodied thereon according to claim 18 wherein the computer-executable instructions cause the at least one processor to:
add a constraint for each observed path, the constraint specified as an interleaving sequence of states and a cost;
insert a "Bellman" constraint for each state on the path, and each neighboring state on the path; and
solve the cost functions using a maximization objective that is the sum of terms expressing the margin for each action taken.

20. One or more computer-readable storage media having computer-executable instructions embodied thereon according to claim 12 wherein the computer-executable instructions cause the at least one processor to at least one of:
- dispose of the action example as uninteresting such that it will not be further analyzed;
- save the action example and explaining the example away by other costs afforded to the agent of interest and not extending a basis function set; and
- construct a basis function that explains the behavior of the agent of interest and extending the basis function set.

21. A method comprising:
- utilizing the output of a tracking system to track and store observations of behaviors of an agent;
- estimating an optimal path for the agent based on the stored observations of agent behavior;
- deriving with a processing device and based on the stored data, a resolving utility function;
- determining at least one percept of the agent regarding a set of costs that the agent incurred for the observed behavior; and
- determining anomalous behavior of the agent based at least on the set of costs, the at least one percept, and the derived resolving utility function.

* * * * *